(12) United States Patent
Endo (10) Patent No.: US 6,744,232 B2
(45) Date of Patent: Jun. 1, 2004

(54) CONTROL UNIT FOR ELECTRIC POWER STEERING APPARATUS

(75) Inventor: Shuji Endo, Gumma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/922,738

(22) Filed: Aug. 7, 2001

(65) Prior Publication Data

US 2002/0017885 A1 Feb. 14, 2002

(30) Foreign Application Priority Data

Aug. 7, 2000 (JP) ........................................ 2000-238331

(51) Int. Cl.[7] ................................................. H02P 7/00
(52) U.S. Cl. ........................................ 318/432; 318/433
(58) Field of Search ................................. 318/432, 433, 318/434, 437

(56) References Cited

U.S. PATENT DOCUMENTS

| | | | | |
|---|---|---|---|---|
| 5,801,504 A | * | 9/1998 | Endo et al. ................. | 318/434 |
| 6,184,637 B1 | * | 2/2001 | Yamawaki et al. ......... | 318/432 |
| 6,278,922 B1 | * | 8/2001 | Nishiwaki ................... | 180/197 |
| 6,360,151 B1 | * | 3/2002 | Suzuki et al. ............... | 180/446 |

* cited by examiner

Primary Examiner—Marlon Fletcher
(74) Attorney, Agent, or Firm—Sughrue Mion, PLLC (57) ABSTRACT

A control unit for an electric power steering apparatus that controls a motor for giving steering assist force to a steering mechanism, based on a current control value calculated from a steering assist command value calculated based on the steering torque generated in the steering shaft, and a current value of the motor, wherein the control unit comprises a current dither signal generating unit for generating a current dither signal when the motor angular velocity is within a predetermined range of angular speed, and for adding the current dither signal to the steering assist command value.

4 Claims, 12 Drawing Sheets

Phase Compensation

FIG. 11

Approximate Differentiation

FIG. 12

Approximate Differentiation
+
Phase Compensation

FIG. 13

Basic Assist Characteristic

CONTROL UNIT FOR ELECTRIC POWER STEERING APPARATUS

BACKGROUND OF THE INVENTION

1. Field of the Invention

The present invention relates to a control unit for an electric power steering apparatus that provides steering assist force by motor to the steering system of an automobile or a vehicle. The invention particularly relates to a control unit for an electric power steering apparatus that generates a current dither signal for removing the influence of static friction in a completely stationary status of the motor.

2. Description of the Related Art

An electric power steering apparatus for applying assist load to the steering apparatus of an automobile or a vehicle using turning effort of a motor applies the driving force of the motor to a steering shaft or a rack axis based on a transmission mechanism like gears or belts via a reduction gear. Such a conventional electric power steering apparatus carries out a feedback control of a motor current for accurately generating an assist torque(a steering assist torque). The feedback control is for adjusting a motor application voltage so as to minimize a difference between a current control value and a motor current detection value. The motor application voltage is generally adjusted based on a duty ratio of a PWM (Pulse Width Modulation) control.

Figure 1:
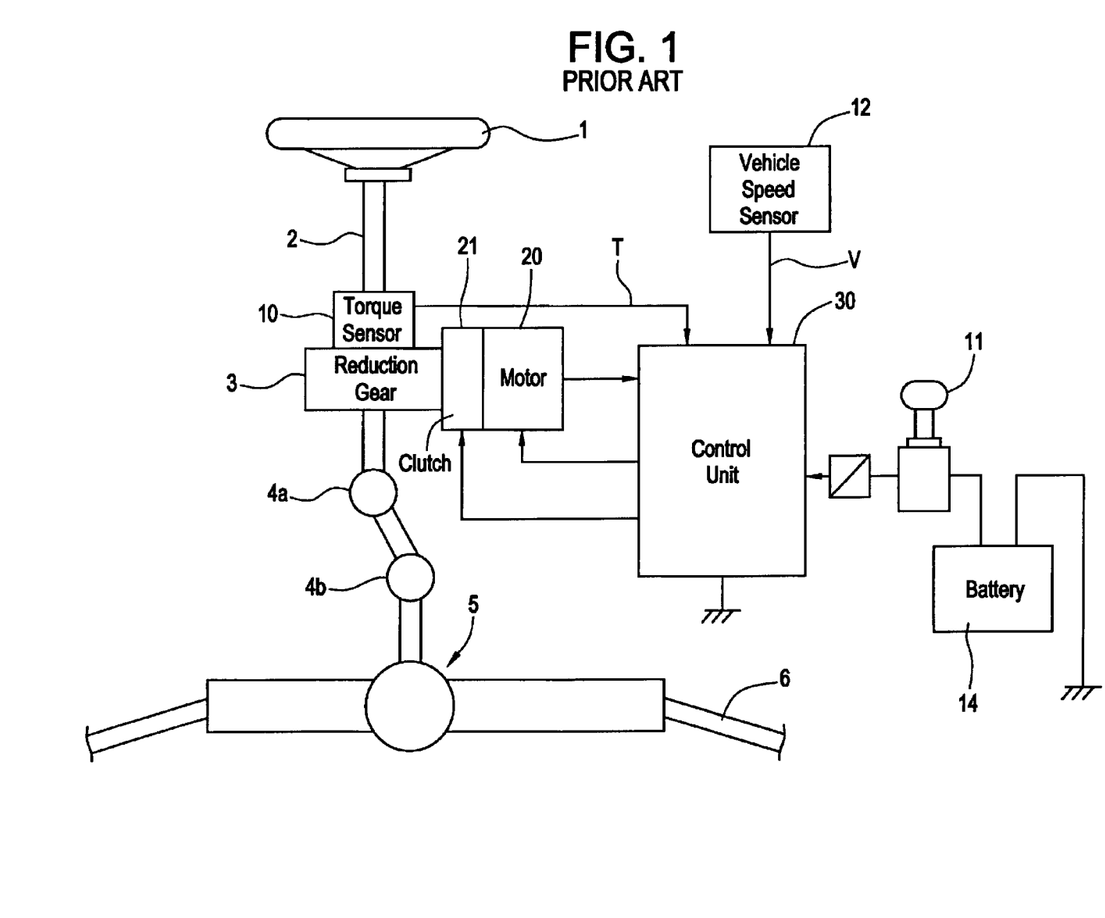
FIG. 1 is a block structure diagram showing an example of an electric power steering apparatus.

A general structure of an electric power steering apparatus will be explained with reference to FIG. 1. A shaft 2 of a steering wheel 1 is connected to a tie rod 6 of running wheels through a reduction gear 3, universal joints 4a and 4b, and a pinion rack mechanism 5. The shaft 2 is provided with a torque sensor 10 for detecting a steering torque of the steering wheel 1. A motor 20 for assisting the steering force of the steering wheel 1 is connected to the shaft 2 through a clutch 21 and the reduction gear 3. A control unit 30 for controlling the power steering apparatus is supplied with power from a battery 14 through an ignition key 11. The control unit 30 calculates a steering assist command value I of an assist command based on a steering torque T detected by the torque sensor 10 and a vehicle speed V detected by a vehicle speed sensor 12. The control unit 30 then controls a current to be supplied to the motor 20 based on the calculated steering assist command value I. The clutch 21 is ON/OFF-controlled by the control unit 30, and is kept ON (connected) in an ordinary operation status. When the control unit 30 has decided that the power steering apparatus is in failure, and also when the power source(voltage Vb) of the battery 14 has been turned OFF with the ignition key 11, the clutch 21 is turned OFF (disconnected).

Figure 2:
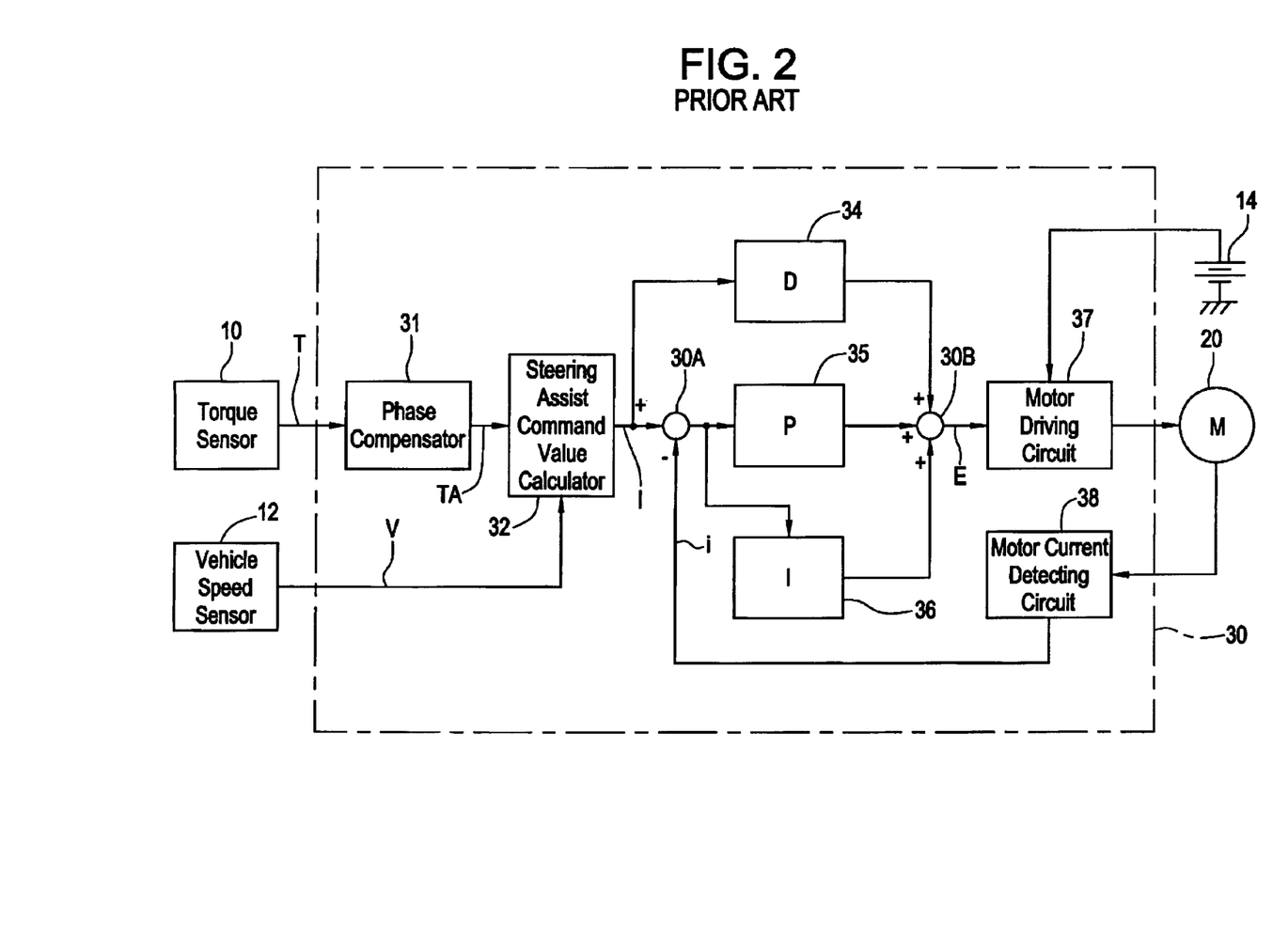
FIG. 2 is a block diagram showing a general internal structure of a control unit.

The control unit 30 is mainly composed of a CPU. FIG. 2 shows general functions to be executed based on a program inside the CPU. For example, a phase compensator 31 does not show a phase compensator as independent hardware, but shows a phase compensation function to be executed by the CPU.

Functions and operation of the control unit 30 will be explained below. A steering torque T detected by the torque sensor 10 and then input is phase-compensated by the phase compensator 31 for increasing the stability of the steering system. The phase-compensated steering torque TA is inputted to a steering assist command value calculator 32. A vehicle speed V detected by the vehicle speed sensor 12 is also inputted to the steering assist command value calculator 32. The steering assist command value calculator 32 calculates a steering assist command value I as a control target value of a current to be supplied to the motor 20, based on the inputted steering torque TA and the inputted vehicle speed V. The steering assist command value I is inputted to a subtractor 30A, and is also inputted to a differential compensator 34 of a feedforward system for increasing a response speed. A difference (I−i) calculated by the subtractor 30A is inputted to a proportional calculator 35, and is also inputted to an integration calculator 36 for improving the characteristic of a feedback system. Outputs from the differential compensator 34 and the integration calculator 36 are inputted to an adder 30B, and are added together by the adder 30B. A result of the addition by the adder 30B is obtained as a current control value E, and this is inputted to a motor driving circuit 37 as a motor driving signal. A motor current value i of the motor 20 is detected by a motor current detecting circuit 38, and the motor current value i is inputted to the subtractor 30A and is fed back.

Figure 3:
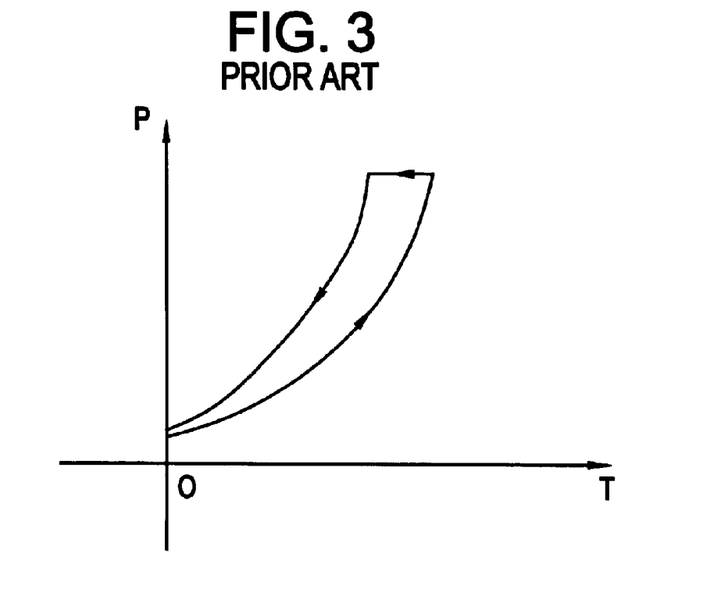
FIG. 3 is a line-connection diagram showing an example of a motor driving circuit.
Figure 4:
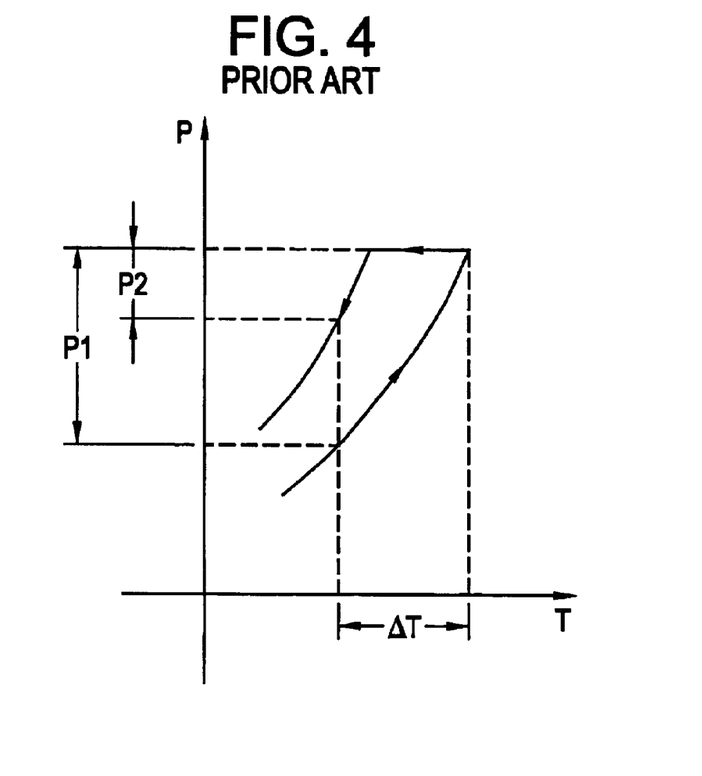
FIG. 4 is a diagram showing an example of the operation of a hydraulic power steering apparatus.

According to a widely-distributed hydraulic power steering apparatus, the apparatus has a characteristic that the friction of a cylinder section increases in proportion to a cylinder pressure P (a horizontal axis T represents a steering torque), as shown in FIG. 3. The apparatus has hysteresis because of the frictional characteristic. When a vehicle is cornering, for example, the hysteresis prevents the steering wheel from being suddenly returned by a self-aligning torque. This improves the steering of the driver. FIG. 4 shows this status. When the steering torque T has suddenly changed by ΔT, the cylinder pressure P changes by P1 in the absence of hysteresis. However, in the presence of hysteresis, the cylinder pressure P changes by P2(<P1). Therefore, in the presence of hysteresis, it is possible to make smooth the change in the cylinder pressure P in relation to a change in the steering torque T. It has been known that the hysteresis width changes according to a size of friction. In the case of a rubber packing of a hydraulic cylinder, the rubber is compressed along an increase in the cylinder pressure. The hysteresis width increases based on an increase in Coulomb friction. It is important for the steering that the driver feels strong self-aligning torque at a neutral point, and does not feel so strong self-aligning torque when the vehicle is cornering. In this sense, it is ideal that, like in the hydraulic power steering apparatus, the friction (hysteresis) becomes small in an area of a small steering angle θ, and the friction (hysteresis) becomes large in an area of a large steering angle θ.

Figure 5:
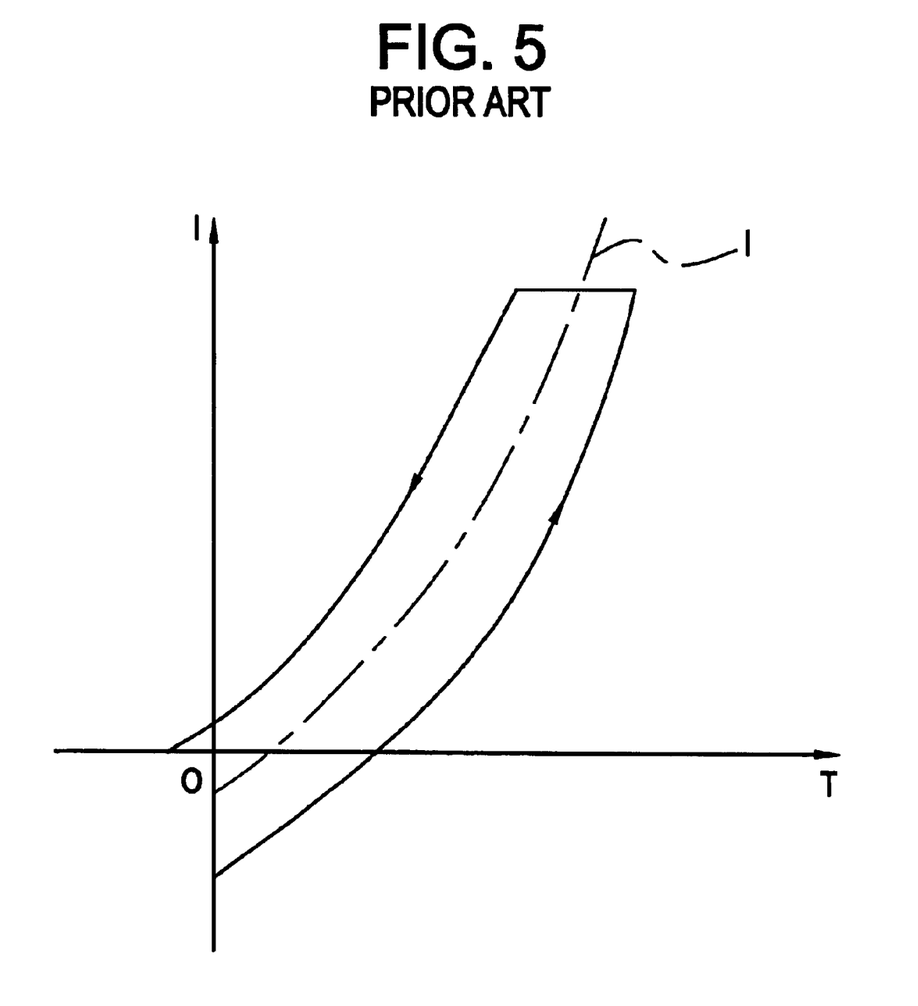
FIG. 5 is a diagram for explaining the effect of hysteresis characteristics.
Figure 6:
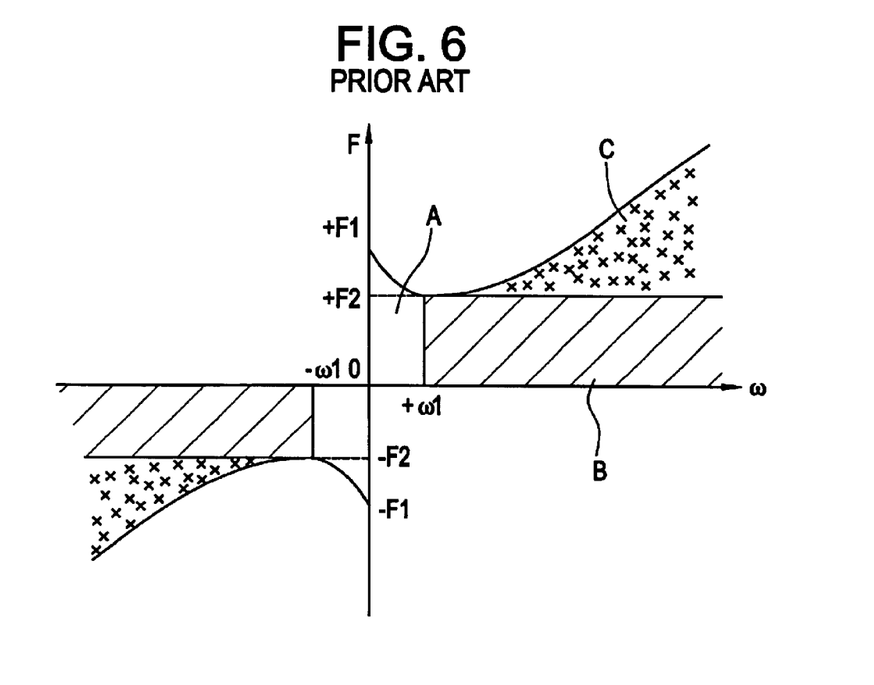
FIG. 6 is a diagram showing a friction characteristic of an electric power steering apparatus.

On the other hand, according to an electric power steering apparatus, the apparatus has constant friction independent of the assist torque T, as shown in FIG. 5. FIG. 6 shows a relationship between a motor angular velocity ω and friction F. Static friction works in an area "A"(−ω1 to +ω1) where the motor angular velocity ω is small. In other angular velocity areas (lower than −ω1, and higher than +ω1), the friction F appears as an addition of Coulomb friction B of a constant value (+F2, −F2) and viscous friction C that increases two dimensionally along an increase in the motor angular velocity ω.

From the relationship between the motor angular velocity ω and the friction F shown in FIG. 6, the friction characteristic becomes discontinuous at a position where the motor angular velocity ω is near to zero. Therefore, there is an inconvenience that when the steering angle has become completely stationary at certain timing, the driver feels that the steering wheel has been fixed to this position. The electric power steering apparatus carries out various kinds of compensation, including the compensation for the motor inertia for improving the steering performance, and compensation for removing the influence of friction. As the above compensation control is carried out based on the motor angular velocity, it is not possible to remove the influence of a status that the motor is completely stationary. In other words, it is not possible to remove the influence of the static friction of the electric power steering apparatus.

SUMMARY OF THE INVENTION

The present invention has been made in the light of the above situations. It is an object of the present invention to provide a control unit for an electric power steering apparatus capable of obtaining continuous and stable feeling of steering, by removing the influence of static friction in a completely stationary status of the motor of the electric power steering apparatus.

In order to achieve the above object, according to one aspect of the present invention, there is provided a control unit for an electric power steering apparatus that controls a motor for giving steering assist force to a steering mechanism, based on a current control value calculated from a steering assist command value calculated based on the steering torque generated in the steering shaft, and a current value of the motor. Particularly, the control unit has a current dither signal generating unit for generating a current dither signal when the motor angular velocity is within a predetermined range of angular speed, and for adding the current dither signal to the steering assist command value.

According to another aspect of the invention, there is provided a control unit for an electric power steering apparatus of the above aspect, wherein the predetermined value is an angular velocity of the motor corresponding to the static friction or the current dither signal is expressed as K·sin $\omega_o t$, where K is a constant and $\omega_o$ represents a dither angular frequency.

DETAILED DESCRIPTION OF THE PREFERRED EMBODIMENTS

Figure 7:
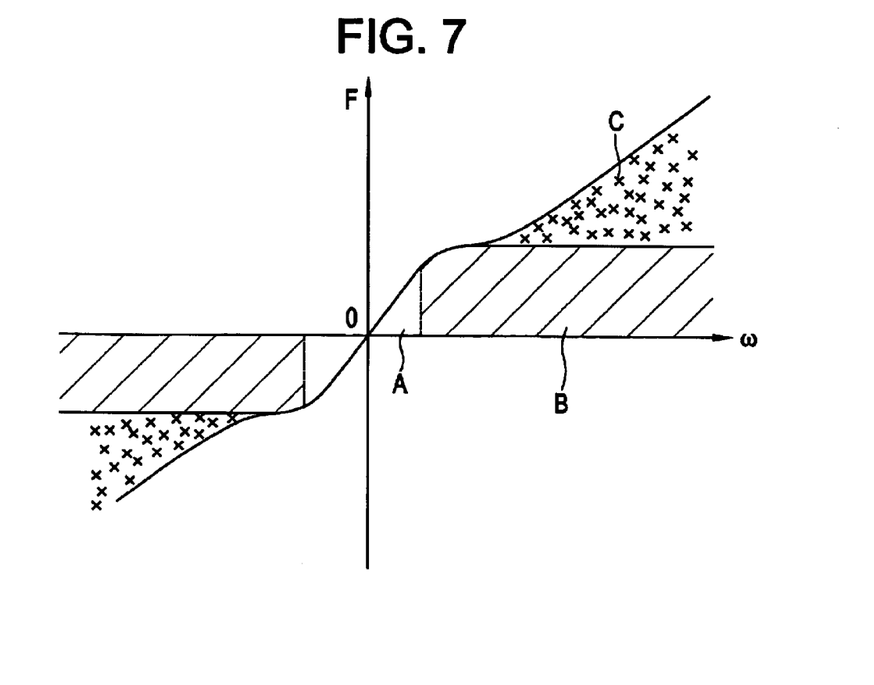
FIG. 7 is a diagram for explaining the basic concept of the present invention.

According to the present invention, in an area where the motor angular velocity is small, a fine current dither signal is applied to a steering assist command value, thereby to make the friction characteristic apparently continuous in relation to the motor angular velocity. With this arrangement, the influence of the static friction characteristic of the motor angular velocity near to zero is removed. In other words, according to the present invention, the motor is fine oscillated to the extent that the driver does not sense the oscillation of the motor, by adding the current dither signal to the steering assist command value. Thus, the friction characteristic in relation to the motor angular velocity is set continuous as shown in FIG. 7. As a result, there is no such conventional inconvenience that when the steering angle has become completely stationary, the driver feels that the steering wheel has been fixed to this position.

Embodiments of the present invention will be explained with reference to the drawings.

Figure 8:
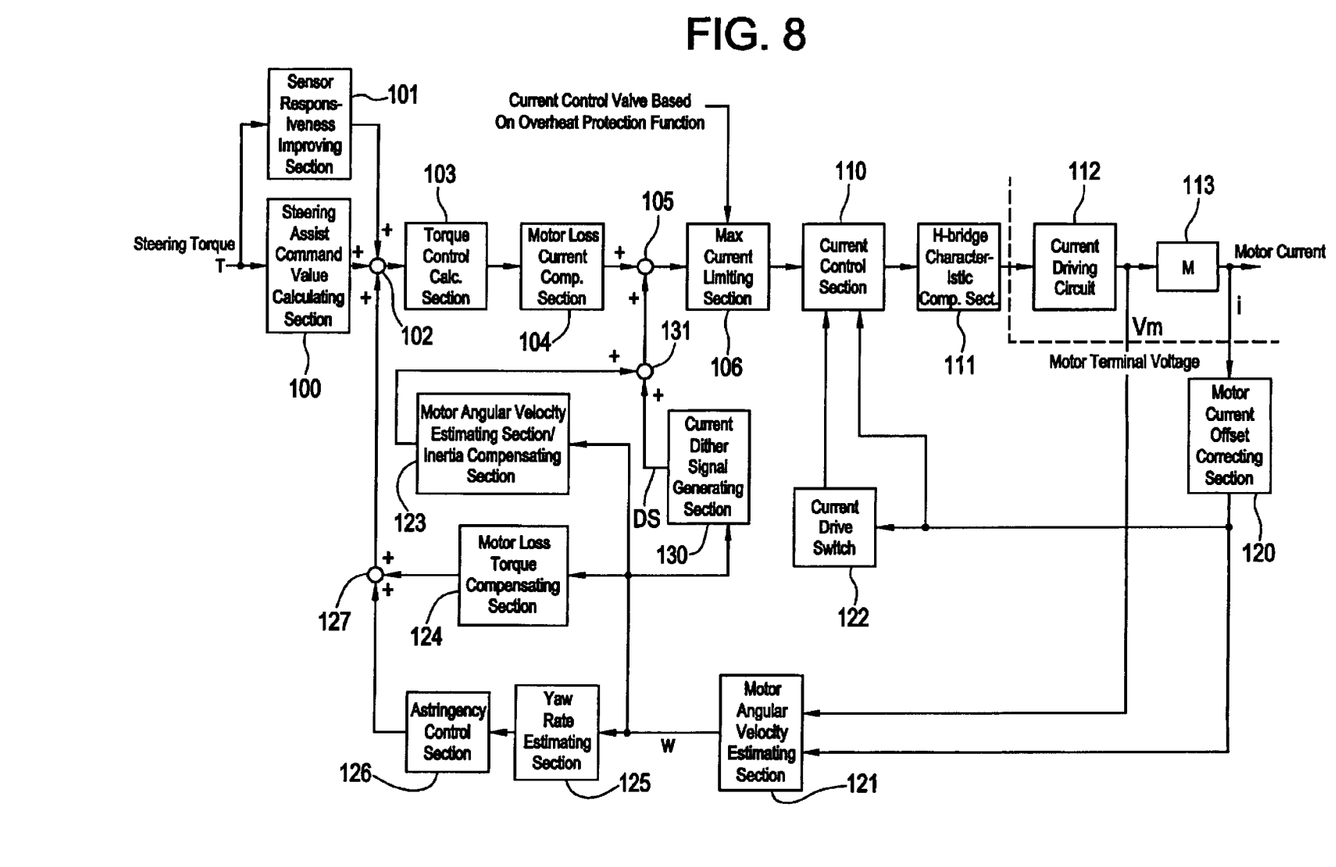
FIG. 8 is a block diagram showing an example of a structure of the present invention.

FIG. 8 is a total block diagram showing control functions of the present invention. A steering torque T is inputted to a steering assist command value calculating section 100 and a center responsiveness improving section 101. Outputs from these sections are inputted to an adder 102. A result of an addition by the adder 102 is inputted to a torque control calculating section 103. An output signal from the torque control calculating section 103 is inputted to a motor loss current compensating section 104. An output signal of the motor loss current compensating section 104 is inputted to a maximum current limiting section 106 via an adder 105. A maximum current value limited by the maximum current limiting section 106 is inputted to a current control section 110. An output of the current control section 110 is inputted to a current driving circuit 112 via an H-bridge characteristic compensating section 111. Based on this, the current driving circuit 112 drives a motor 113.

A motor current i of the motor 113 is inputted to a motor angular velocity estimating section 121, a current drive switching section 122, and the current control section 110, via a motor current offset correcting section 120. A motor terminal voltage Vm is inputted to the motor angular velocity estimating section 121. An angular velocity ω estimated by the motor angular velocity estimating section 121 is inputted to a motor angular velocity estimating section/ inertia compensating section 123, a motor loss torque compensating section 124 and a yaw rate estimating section 125. An output of the yaw rate estimating section 125 is inputted to an astringency control section 126. Outputs of the astringency control section 126 and the motor loss torque compensating section 124 are inputted to an adder 127, and are added together by the adder 127. A result of the addition is inputted to the adder 102. The motor loss torque compensating section 124 assists torque corresponding to a loss torque of the motor 113 to a direction in which the loss torque is generated. In other words, the motor loss torque compensating section 124 assists torque to a rotation direction of the motor 113. The astringency control section 126 applies braking to the oscillation of the steering wheel for improving the astringency of the yaw of the vehicle.

Further, a current dither signal generating section 130 is provided for generating a dither signal DS for fine oscillating the motor 113 to a level that the driver does not sense. Outputs of the current dither signal generating section 130 and the motor angular velocity estimating section/inertia compensating section 123 are added by an adder 131. A result of this addition is inputted to the adder 105. A result of the addition in the adder 105 is inputted to the maximum current limiting section 106. The angular velocity $\omega$ from the motor angular velocity estimating section 121 is also inputted to the current dither signal generating section 130. The current dither signal generating section 130 generates a sinusoidal wave dither signal DS having a wavelength $\Delta\omega$ and a frequency 40 Hz within a range of $\pm\omega 2$ where the angular velocity $\omega$ is near to zero.

Figure 9:
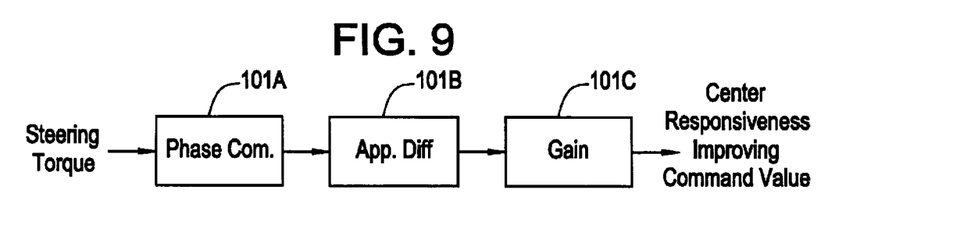
FIG. 9 is a block structure diagram showing a center responsiveness improving section.
Figure 10:
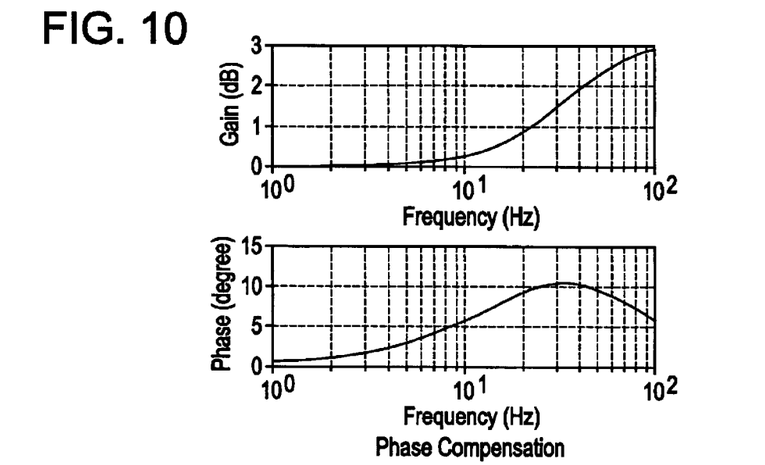
FIG. 10 is a diagram showing an example of a characteristic of a phase advancement compensating section.
Figure 11:
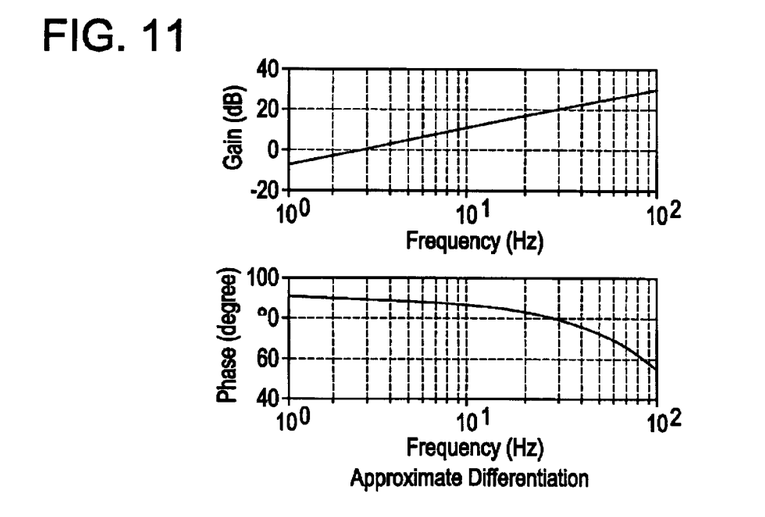
FIG. 11 is a diagram showing an example of a characteristic of an approximate differentiating section.
Figure 12:
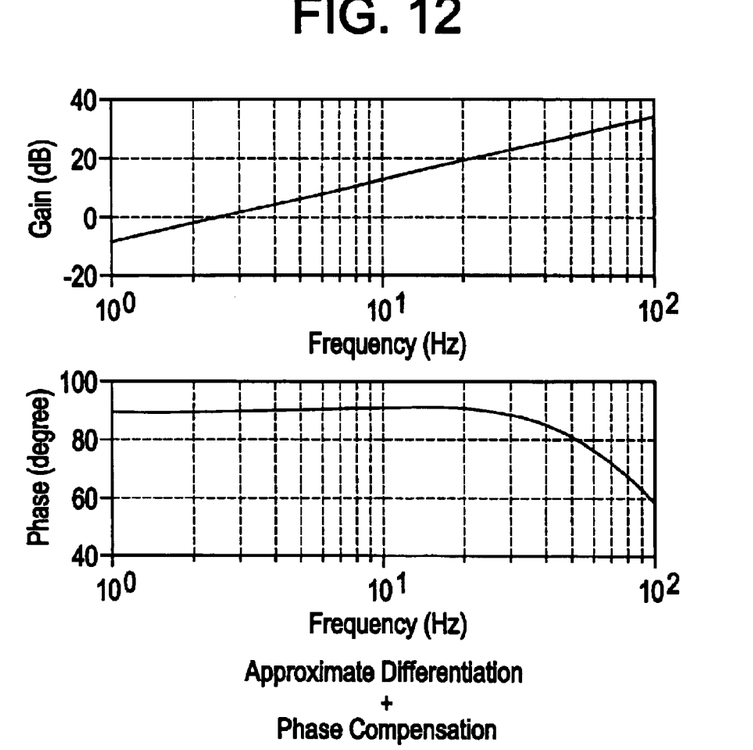
FIG. 12 is a diagram showing a combined characteristic of the phase advancement compensating section and the approximate differentiating section.

Based on the above structure, according to the present invention, the center responsiveness improving section 101 consists of a phase advancement compensating section 101A, an approximate differentiating section 101B and a gain setting section 101C as shown in FIG. 9. Further, the phase advancement compensating section 101A has a frequency characteristic as shown in FIG. 10, and the approximate differentiating section 101B has a frequency characteristic as shown in FIG. 11. With this arrangement, a combined characteristic of the phase advancement compensation and the approximate differentiation compensation becomes as shown in FIG. 12. As a result, it becomes possible to obtain a phase characteristic with no phase delay.

Figure 13:
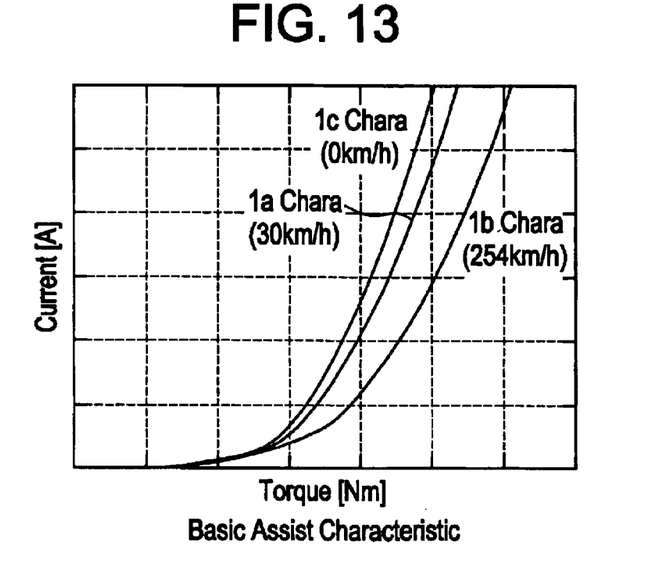
FIG. 13 is a diagram showing a basic assist characteristic.
Figure 14:
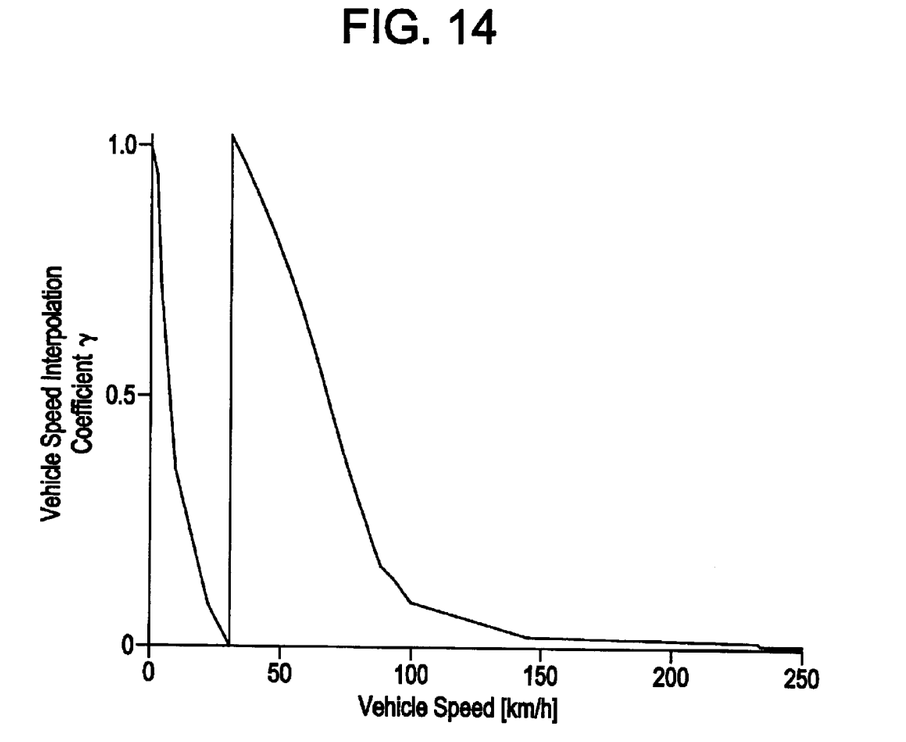
FIG. 14 is a diagram showing an example of a vehicle speed interpolation calculation.

Further, according to the present invention, the steering assist command value calculating section 100 sets the assist characteristic of three representative vehicle speeds (0, 30, 254 Km/h) as a basic assist characteristic in the calculation of the assist value. The steering assist command value calculating section 100 calculates the assist values at other speeds by interpolating between the basic assist characteristics for every 2 Km/h of the vehicle speed according to the vehicle interpolation gain. Then, the vehicle speed of the assist characteristic is set to a range from 0 to 254 Km/h, and the resolution is set as 2 Km/h. FIG. 13 shows the basic assist characteristic(torque versus current). The basic assist characteristic is expressed as 0 Km/h=1o characteristic, 30 Km/h=1a characteristic and 254 Km/h=1b characteristic. For other vehicle speeds, the assist current is calculated by interpolating between the vehicle speeds for every 2 Km/h using a vehicle (Km/h) versus vehicle speed interpolation coefficient $\gamma$ shown in FIG. 14. When the vehicle speed is from 0 to 30 Km/h, the assist current I is I=1a(T)+$\gamma$(V)(1o(T)−1a(T)). When the vehicle speed is from 32 to 254 Km/h, the assist current I is I=1b(T)+$\gamma$(V)(1a(T)−1b(T)).

Figure 15A:
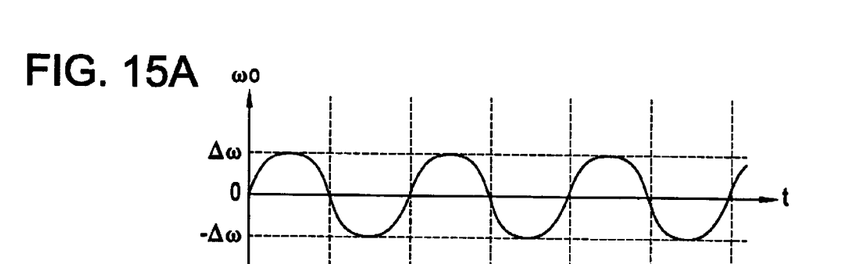
FIGS. 15A and 15B are a diagrams for explaining a current dither signal according to the present invention.
Figure 15B:
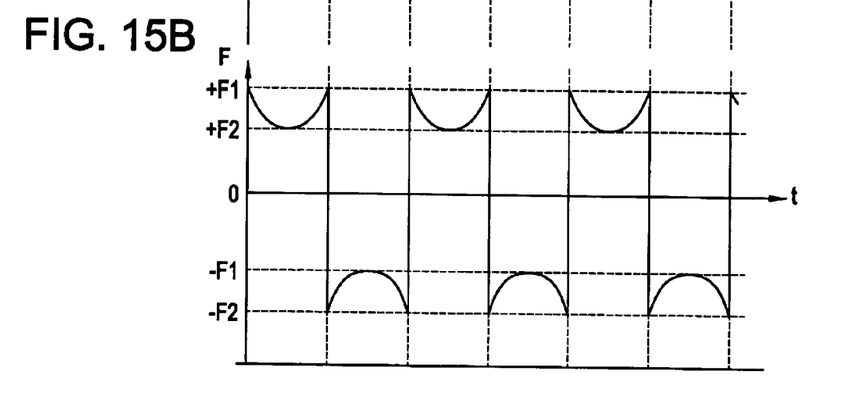
Figure 16:
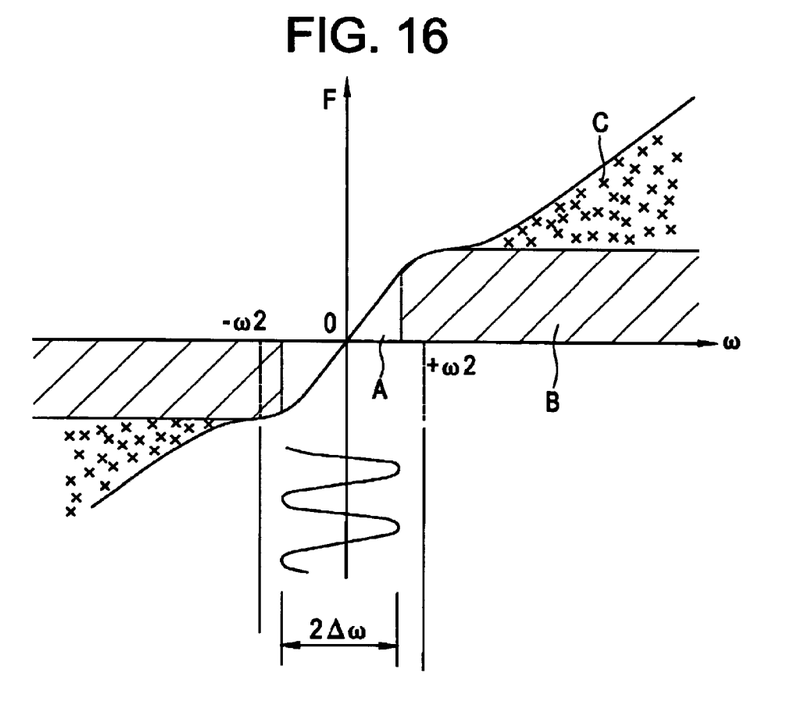
FIG. 16 is a diagram for explaining the operation of the present invention.
Figure 17:
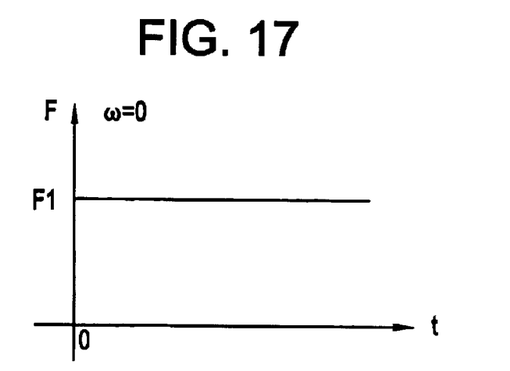
FIG. 17 is a diagram showing a friction characteristic when the motor angular velocity is zero.

According to the present invention, the current dither signal generating section 130 is provided for removing the influence of the static friction. When the motor angular velocity $\omega$ is within a range of $\pm\omega 2$ that is near to zero, the current dither signal generating section 130 generates a dither signal DS of a sinusoidal wave sin $\omega_o t$ having a waveheight $\Delta\omega$ and a frequency 40 Hz corresponding to the angular frequency $\omega_o$ shown in FIG. 15A and FIG. 16. Based on this, the friction when the angular frequency $\omega_o$ is zero becomes the static friction Fl that is constant as shown in FIG. 17, without the dither signal. When the angular frequency $\omega_o$ has become a crest value of the sinusoidal wave, Coulomb friction F2 is obtained based on a reduction of the portion. During this period, the friction changes corresponding to the increase and decrease in the size of the sinusoidal wave, and a friction characteristic as shown in FIG. 15B is obtained. As a result, the plus and minus of the friction characteristic are canceled to zero in total, and the friction characteristic becomes uniform. As the motor is fine oscillated at a position where the motor angular velocity $\omega$ is near to zero, the friction characteristic in relation to the motor angular velocity $\omega$ becomes a continuous characteristic at the motor angular velocity near to zero as shown in FIG. 16. The angular frequency $\omega_o$ is ideally 40 Hz within the range from 30 to 50 Hz. Within this range, the driver does not sense the oscillation of the motor.

Figure 18:
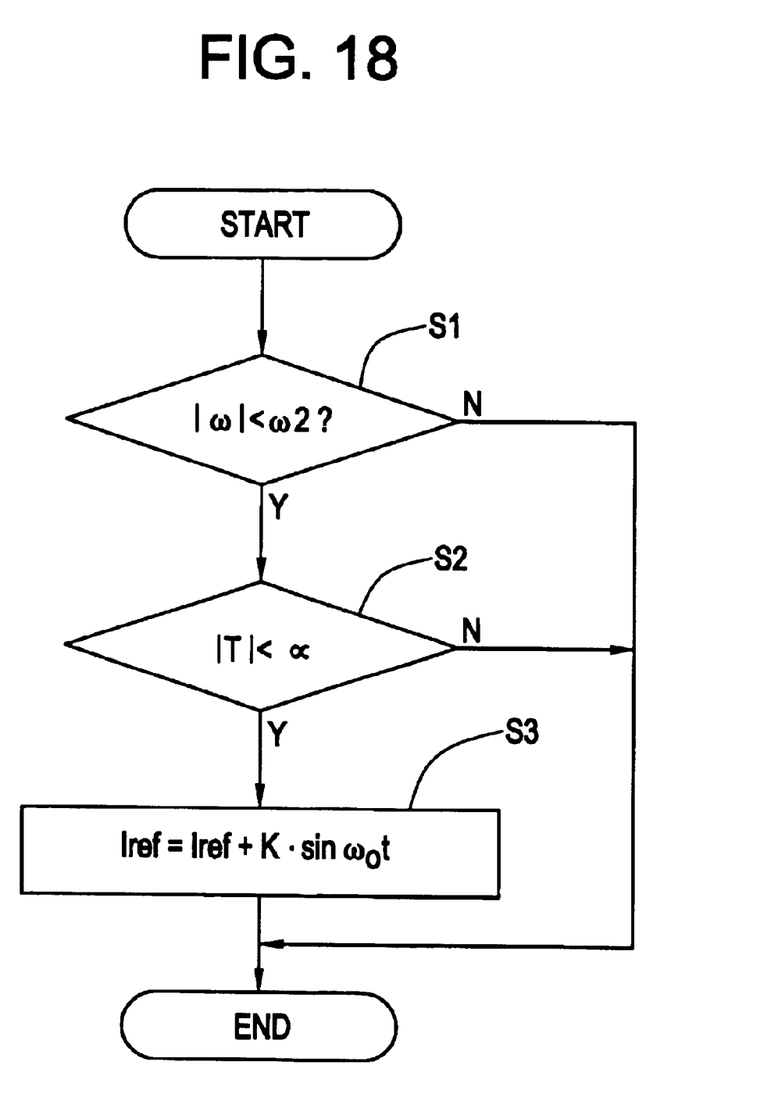
FIG. 18 is a flowchart showing an example of the operation of the present invention.

FIG. 18 shows an example of the actual process of the operation of the current dither signal generating section 130. First, the current dither signal generating section 130 decides whether the motor angular velocity $\omega$ is within a predetermined range of $\pm\omega 2$ or not (Step S1). When the motor angular velocity $\omega$ is within the range of $\pm\omega 2$, the current dither signal generating section 130 decides whether the size(absolute value) of the steering torque T is smaller than a predetermined value $\alpha$ or not (Step S2). The predetermined value $\pm\omega 2$ may be at the motor angular velocity $\omega$ near to zero, and the range is not limited to $\pm\omega 2$. When the steering torque T is smaller than the predetermined value $\alpha$, the current dither signal generating section 130 generates a dither signal DS of a sinusoidal wave K·sin $\omega_o t$, where K is a constant, and applies this dither signal to a steering assist command value Iref. With this arrangement, it is possible to fine oscillate the motor at the motor angular velocity $\omega$ near to zero where the driver does not sense the oscillation. The current dither signal generating section 130 decides on the steering torque T in order to obtain a satisfactory steering wheel return characteristic only when the steering wheel torque T is small.

As explained above, according to the present invention, a dither signal is generated for fine oscillating the motor at the motor angular velocity near to zero, and this dither signal is applied to the assist value (steering assist assist value). The oscillation of the motor based on the dither signal is in the frequency and the size that the driver does not sense. Therefore, it is possible to avoid the influence of the static friction at the motor angular velocity near to zero. Further, as the friction characteristic can be continued at the motor angular velocity near to zero, it is possible to avoid unnecessary feeling of the steering, and it is possible to obtain comfortable steering feeling.

What is claimed is:

1. A control unit for an electric power steering apparatus that controls a motor for giving steering assist force to a steering mechanism based on a current control value calculated from a steering assist command value calculated based on the steering torque generated in the steering shaft, and a current value of the motor, wherein the control unit comprises a current dither signal generating unit for generating a current dither signal when the motor angular velocity is within a predetermined range of an angular speed $\omega$, and for adding the current dither signal to the steering assist command value, wherein the predetermined value is the angular velocity $\omega$ of the motor corresponding to the static friction.

2. The control unit for an electric power steering apparatus according to claim 1, wherein the current dither signal is expressed as K·sin$\omega_o t$, where K is a constant and $\omega_o$ represents a dither angular frequency.

3. The control unit for an electric power steering apparatus according to claim 2, wherein the dither angular frequency $\omega_o$, is a range of 30–50 Hz.

4. The control unit for an electric power steering apparatus according to claim 3, wherein the dither angular frequency $\omega_o$ is 40 Hz.

* * * * *